United States Patent
Suzuki et al.

(10) Patent No.: US 7,106,455 B2
(45) Date of Patent: Sep. 12, 2006

(54) INTERFEROMETER AND INTERFERANCE MEASUREMENT METHOD

(75) Inventors: Akiyoshi Suzuki, Tokyo (JP); Yoshiyuki Sekine, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 10/091,985

(22) Filed: Mar. 6, 2002

(65) Prior Publication Data

US 2003/0011783 A1 Jan. 16, 2003

(30) Foreign Application Priority Data

Mar. 6, 2001 (JP) ............................ 2001-062065
Apr. 9, 2001 (JP) ............................ 2001-109998

(51) Int. Cl.
*G01B 9/02* (2006.01)

(52) U.S. Cl. ............... 356/512; 356/513; 356/521; 378/36

(58) Field of Classification Search ............ 356/512, 356/513, 521, 511; 378/36
See application file for complete search history.

(56) References Cited

U.S. PATENT DOCUMENTS

| 3,305,294 | A |   | 2/1967 | Alvarez |         |
|-----------|---|---|--------|---------|---------|
| 4,536,086 | A |   | 8/1985 | Shemwell |        |
| 4,725,144 | A |   | 2/1988 | Nelson et al. |   |
| 4,743,117 | A | * | 5/1988 | Kitabayashi et al. | 356/520 |
| 4,958,931 | A | * | 9/1990 | Tatian | 356/513 |
| 5,530,547 | A | * | 6/1996 | Arnold | 356/458 |
| 5,625,454 | A | * | 4/1997 | Huang et al. | 356/513 |
| 5,737,079 | A | * | 4/1998 | Burge et al. | 356/513 |
| 5,898,501 | A | * | 4/1999 | Suzuki et al. | 356/511 |
| 6,312,373 | B1 |  | 11/2001 | Ichihara |      |
| 6,342,703 | B1 |  | 1/2002 | Koga et al. |     |
| 6,456,382 | B1 | * | 9/2002 | Ichihara et al. | 356/513 |
| 2002/0176090 | A1 | * | 11/2002 | Ohsaki et al. | 356/512 |

FOREIGN PATENT DOCUMENTS

| JP | 5-1970 | 1/1993 |
| JP | 7-229721 | 8/1995 |
| JP | 2000-97666 | 4/2000 |
| JP | 2000-133579 | 5/2000 |
| JP | 2002-310611 | 10/2002 |
| JP | 2002-310612 | 10/2002 |

* cited by examiner

*Primary Examiner*—Andrew H. Lee
(74) *Attorney, Agent, or Firm*—Morgan & Finnegan, L.L.P.

(57) ABSTRACT

There is provided an interferometer for measuring a surface shape of an optical element using interference, including a reference wave-front generating unit for generating a reference wave front for measuring the surface shape, which is provided in a target optical path, and includes an Alvarez lens.

33 Claims, 10 Drawing Sheets

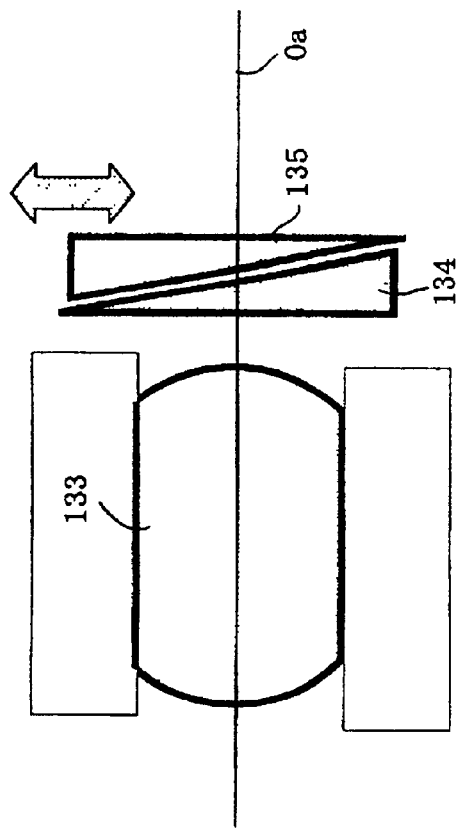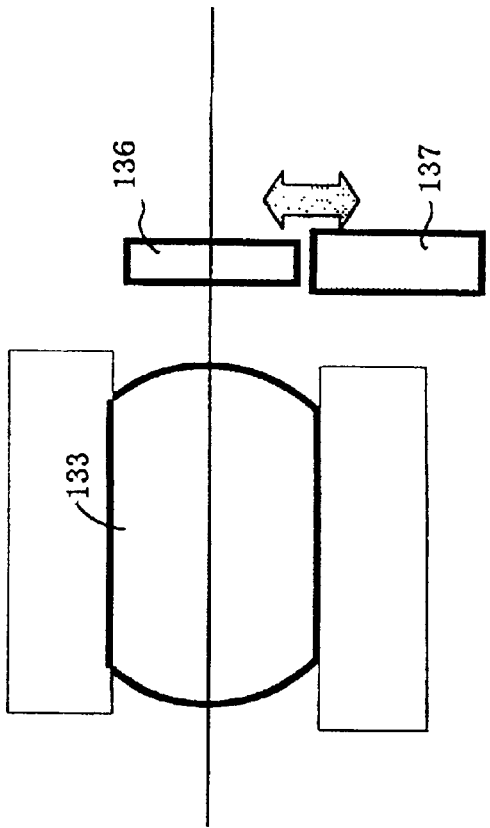
FIG. 5B
FIG. 5C
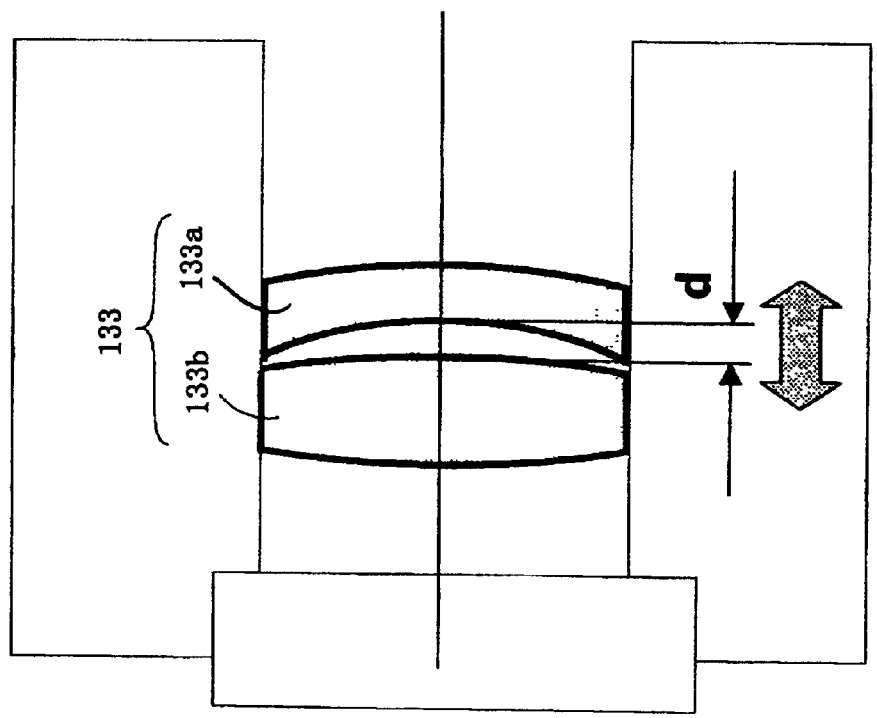
FIG. 5A

INTERFEROMETER AND INTERFERANCE MEASUREMENT METHOD

BACKGROUND OF THE INVENTION

The present invention relates generally to apparatuses and methods for measuring a shape of a surface, and more particularly to an interferometer and an interference measurement method. The present invention is suitably used to measure a wide range of surface shapes from a spherical surface to an aspheric surface of a target object with high precision.

The present invention is also suitably used to measure surface shapes including a spherical surface, an aspheric surface, etc., of each optical element (e.g., a lens, a filter, etc.) in a projection optical system for use with a lithography process that transfers a pattern on a mask onto a photosensitive substrate, and manufactures a semiconductor device, etc.

Innovations in optical systems have always been provided by introductions of a new optical element and/or a degree of freedom. Among them, recent developments in process and measurement methods have successfully applied optical performance improved by the advent of aspheric surfaces, which has been sought in astronomical telescopes, to semiconductor exposure apparatuses used to manufacture semiconductor devices, which require extremely high accuracy.

There are three major advantages in a semiconductor exposure apparatus using an aspheric surface: The first advantage is the reduced number of optical elements. An optical system in a semiconductor exposure apparatus has necessarily required such expensive materials, as quartz and fluorite, as it requires a shorter wavelength. The reduced number of optical elements as an advantage of the aspheric surface is remarkably preferable for manufacture and cost-reduction purposes. The second advantage is miniaturization. The size reduction as another advantage of the aspheric surface still has drastically promoted manufacture and cost reduction. The third advantage is high performance. Aspheric surfaces are expected to play a more important role to realize an optical system that has increasingly required the high-accuracy performance as a high numerical aperture ("NA") and low aberration advance.

A system using Extreme Ultra Violet ("EUV") light is the likeliest to be elected for an exposure method of next generation to meet recent accelerating demands for the more minute patterns. The EUV system uses light having such a short wavelength as 13.4 nm, which is below one-tenth of a wavelength of light that has been used for conventional exposure, and a reflective image-forming optical system to transfer an image on a reticle onto a wafer. Wavelengths in the EUV range are too short for optical members (or transmissive materials) to transmit the EUV light, and the optical system uses only mirrors with no lenses. In addition, the EUV range restricts usable reflective materials, and mirror's reflectance for each surface is a little less than 70%. Therefore, such a structure as seen in conventional optical systems that use twenty or more lenses is not applicable in view of light use efficiency, and it is necessary to use optical elements as few as possible to form an image-forming optical system that meets desired performance.

Current EUV prototype machines use a three- or four-mirror system with an NA of about 0.10, but prospective systems are expected to use a six-mirror system with an NA of 0.25 to 0.30. As one solution for breaking down such a conventional wall and for realizing a high-performance optical system with fewer elements, it is the necessary technology to actually precisely process and measure aspheric surfaces so as to obtain an optical element with a predetermined surface shape.

However, even when a designed value provides high performance, a conventional aspheric-surface process disadvantageously has the limited measurement accuracy of the aspheric surface and cannot process a surface exceeding a predetermined aspheric surface amount, which is determined by a measurable range with desired precision. As is well known, the measurement and process are interrelated with each other; no precise process is available without good measurement accuracy.

The spherical-shape measurement technology is most commonly used technology to measure optical elements, and there are many general-purpose apparatuses with advanced precision due to continuous endeavors toward precision improvement. However, it is difficult for the aspheric surface amount ten times as large as a measuring wavelength to keep the same measurement precision as the spherical measurement since an interval in an interference fringe is excessively small.

Usually, the Computer Generated Hologram ("CGH") or means for generating a wave front of a desired aspheric surface a dedicated null lens have been well known to measure large aspheric surfaces. However, these conventional approaches have been found to be unavailable for an optical system for semiconductor exposure apparatuses, regardless of whether they have other applications, because manufacture precisions for the CGH or null lens are insufficient for the semiconductor exposure apparatuses, and the CGH uses diffracted light and arduously requires 0-order light process.

There has been known another approach that measures aspheric surfaces using a mechanical or optical probe. Although the probe is so flexible that it is compatible with various shaped aspheric surfaces, the probe disadvantageously has measurement limits and its instable positional measurement. Therefore, this approach hardly provides so precise as an interference measurement method.

Moreover, a method of measuring an aspheric shape and an entire surface has been known which uses an interferometer for normal spherical shape measurements to measure only a segment (which has usually a strap shape) by gradually changing a radius of curvature to be measured. However, this problem includes the following disadvantages:

A target optical system is often co-axial, and thus its optical element often has a rotational symmetry. In general, an aspheric shape is described only by terms of even orders as in an equation (1) below where r is a distance from an optical axis (or a radius or a moving radius), c is a curvature of paraxial spherical surface, and z is the optical-axis direction:

$$z = \frac{cr^2}{1+\sqrt{1-(1+K)c^2r^2}} + Ar^4 + Br^6 + Cr^8 + Dr^{10} \quad (1)$$

Where $K=A=B=C=D=0$ in the equation (1), z becomes a spherical surface with a radius of curvature $R=1/c$. Therefore, an offset amount (or aspheric surface amount) $\delta$ is defined as a subtraction of the spherical surface from the equation (1), which is expanded and expressed only by terms of fourth or higher orders of the distance r as in the following equation (2):

$$\delta = \left\{\frac{1}{8}c^3 K + A\right\}r^4 + \left\{\frac{1}{16}c^5 K(2+K) + B\right\}r^6 + \qquad (2)$$
$$\left\{\frac{5}{128}c^7 K(3+3K+K^2) + C\right\}r^8 +$$
$$\left\{\frac{7}{256}c^9 K(4+6K+4K^2+K^3) + D\right\}r^{10}$$

The term of the fourth order of the distance r is particularly important for an aspheric surface amount. When this offset amount δ exceeds ten times wavelength of measuring light, the measurement becomes difficult due to a too short interval between interference fringes.

As a solution for this problem, an outside of the initially measured area is measured by changing a radius of curvature of a reference aspheric surface to R'=1/c'. According to this method, the aspheric surface amount δ' is expressed by the following equation (3):

$$\delta' = \frac{1}{2}(c-c')r^2 + \left\{\frac{1}{8}c^3(1+K) + A - \frac{1}{8}c'^3\right\}r^4 + \qquad (3)$$
$$\left\{\frac{1}{16}c^5(1+K)^2 + B - \frac{1}{16}c'^5\right\}r^6 +$$
$$\left\{\frac{5}{128}c^7(1+K)^3 + C - \frac{5}{128}c'^7\right\}r^8 +$$
$$\left\{\frac{7}{256} + c^9(1+K)^4 + D - \frac{7}{256}c'^9\right\}r^{10}$$

As a coefficient c' is properly selected, δ'<δ is available in this range. When the aspheric surface amount δ' becomes more than about 10λ where λ is a measurement wavelength, the entire surface may be measured by varying the coefficient c' and repeating measurements of the outside of the segment. However, as a speed of change at a peripheral of the surface is considered, terms of high orders of the distance r become important, such as sixth power and eighth power, whereby an interference-measurable segment becomes extremely narrow due to influence of these terms of high orders.

Therefore, a measurement of the entire surface would require a division into many segments and, in particular, the number of divisions increases at the peripheral of the surface, narrowing a width of a measurable segment. Since measured segments should be connected after each segment is measured, the sufficiently accurate measurement is not available due to erroneous superposition.

BRIEF SUMMARY OF THE INVENTION

Accordingly, it is an exemplary object of the present invention to provide an interferometer and an interference measurement method, which are able to measure an aspheric shape with accuracy similar to that of the spherical-surface measurement, and properly measure various surface shapes.

Another exemplary object of the present invention is to provide an exposure apparatus using an optical element manufactured by using the above interferometer or the interference measurement method.

In order to achieve the above objects, an interferometer of one aspect of the present invention for measuring a surface shape of an optical element using interference includes a reference wave-front generating unit that is provided in a target optical path, and includes an Alvarez lens for generating a reference wave front as a measurement reference for the surface shape.

The Alvarez lens may generate a sixth-order or higher component of a moving radius of the reference wave front. There may be plural Alvarez lenses, and the number of Alvarez lenses may correspond to an order of a moving radius of the reference wave front. The Alvarez lens may generate a fourth-order or higher component of a moving radius of the reference wave front. The reference wave-front generating unit may variably generate a fourth-order or higher component of a moving radius of the reference wave front.

An interferometer of another aspect of the present invention for measuring a surface shape of an optical element using an interference includes a reference wave-front generating unit, provided in a target optical path, for generating a reference wave front as a measurement reference for the surface shape, the unit variably generating a fourth-order or higher component of a moving radius of the reference wave front.

The reference wave-front generating unit may include a plurality of optical members, a reference position of each optical member being determined at such a position that aberration generated in the reference wave-front generating unit may be minimized. The reference wave-front generating unit may have a spherical aberration generating part. The spherical aberration generating mechanism may have a plurality of lens members, and adjusts generation of aberration by adjusting a separation between two of the lens members. The spherical aberration generating mechanism may have a plurality of lens members for serving as a parallel plane, the optical member being able to adjust a parallel plane. The reference wave-front generating unit includes an Alvarez lens. The reference wave-front generating unit may include a mobile part that may variably generate the reference wave front, and a monitor part for monitoring positional information of said mobile part. The interferometer may use a moving amount of the mobile part obtained from the monitor part to calculate the wave front to be generated and use the calculated wave front for the reference wave front.

An interference measurement method of another aspect of the present invention for measuring a surface shape of an optical element using interference includes the steps of generating a reference wave front as a measurement reference for the surface shape by using a reference wave-front generating unit including an Alvarez lens, introducing the reference wave front to a surface of the optical element, and measuring the surface shape by interfering the reference wave front with a target wave front through the surface of the optical element. The reference wave-front generating unit variably generates a fourth-order or higher component of a moving radius of the reference wave front.

An interference measurement method of another aspect of the present invention for measuring a surface shape of an optical element using interference includes the steps of generating a reference wave front as a measurement reference for the surface shape by using a reference wave-front generating unit for variably generating a fourth-order or higher component of a moving radius of the reference wave front, introducing the reference wave front to a surface of the optical element, and measuring the surface shape by interfering the reference wave front with a target wave front through the surface of the optical element.

The reference wave-front generating unit may include a plurality of optical members, a reference position of each optical member being determined at such a position that aberration generated in said reference wave-front generating unit may be minimized. The reference wave-front generating unit includes a mobile part that may variably generate the reference wave front, and wherein said generating step calculating a shape of the reference wave front based on a moving amount obtained by monitoring positional information of the mobile part.

An interferometer of another aspect of the present invention for measuring surface information of a target surface by interfering a reference wave front from a reference mirror with a target wave front from the target surface, the interferometer comprising a reference wave-front generating unit, provided in an optical path for the target surface, for generating a reference wave front as a measurement reference for the surface information of the target surface includes a spherical aberration generating part for variably generating a spherical aberration, and an Alvarez lens part for variably generating a component of sixth or higher power of a moving radius of the reference wave front.

An interference measurement method of still another aspect of the present invention for measuring a surface shape of an optical element using interference includes the steps of dividing a measurement surface of the optical element into at least two segments, and interference-measuring each segment, wherein in measuring a surface shape, a wave front as a measurement reference for a measurement of at least one segment is an aspheric wave front.

The method may further include a step of an aspheric wave-front generating part approximately independently controllably forming each of fourth-order or higher components of a moving radius of the wave front in the aspheric wave front. The method may further include the steps of approximately independently controlling, in the aspheric wave front, each of fourth-order or higher components of a moving radius of the wave front, and controlling curvature of a spherical component for each segment to be measured. The aspheric wave-front generating part may include at least a pair of Alvarez lenses. There may be a one-to-one correspondence between the Alvarez lenses in the aspheric wave-front generating part and a component to be independently controlled. The aspheric wave-front generating part may control three components of fourth, sixth and eighth orders of the moving radius in the wave front in the aspheric wave front, and each component may be approximately independently controlled by a corresponding pair of Alvarez lenses. An aspheric surface amount controlled by the Alvarez lenses may not exceed 20 times wavelength of light used for the measurement.

An interference measurement method of still another aspect of the present invention for measuring a surface shape of an optical element using interference includes the steps of dividing a measurement surface of the optical element into at least two segments, and interference-measuring each segment, wherein in measuring a surface shape, the measurement surface is divided into a plurality of segments according to a distance from an optical axis, and a wave front as a measurement reference for a measurement of at least one segment is an aspheric wave front, and wherein the aspheric wave front is approximately independently controlled in fourth order or higher components in a moving radius of the wave front.

Spherical components in the aspheric wave front may be different for each divided segment, an offset amount between the aspheric wave front and a target surface in each segment may not exceed 10 times wavelength of light used for the measurement. Each of fourth order or higher components of a moving radius in the wave front may be approximately independently controlled by the Alvarez lenses, and an aspheric surface amount of each component may not exceed 20 times wavelength of light used for the measurement.

Exposure apparatuses using an optical element manufactured by using the any one the above interferometers or interference measurement methods also constitute one aspect of the present invention.

Other objects and further features of the present invention will become readily apparent from the following description of preferred embodiments with reference to accompanying drawings.

BRIEF DESCRIPTION OF THE DRAWINGS

FIG. 5 is a view for explaining various spherical aberration generating methods.

DETAILED DESCRIPTION OF THE PREFERRED EMBODIMENTS

Figure 1:
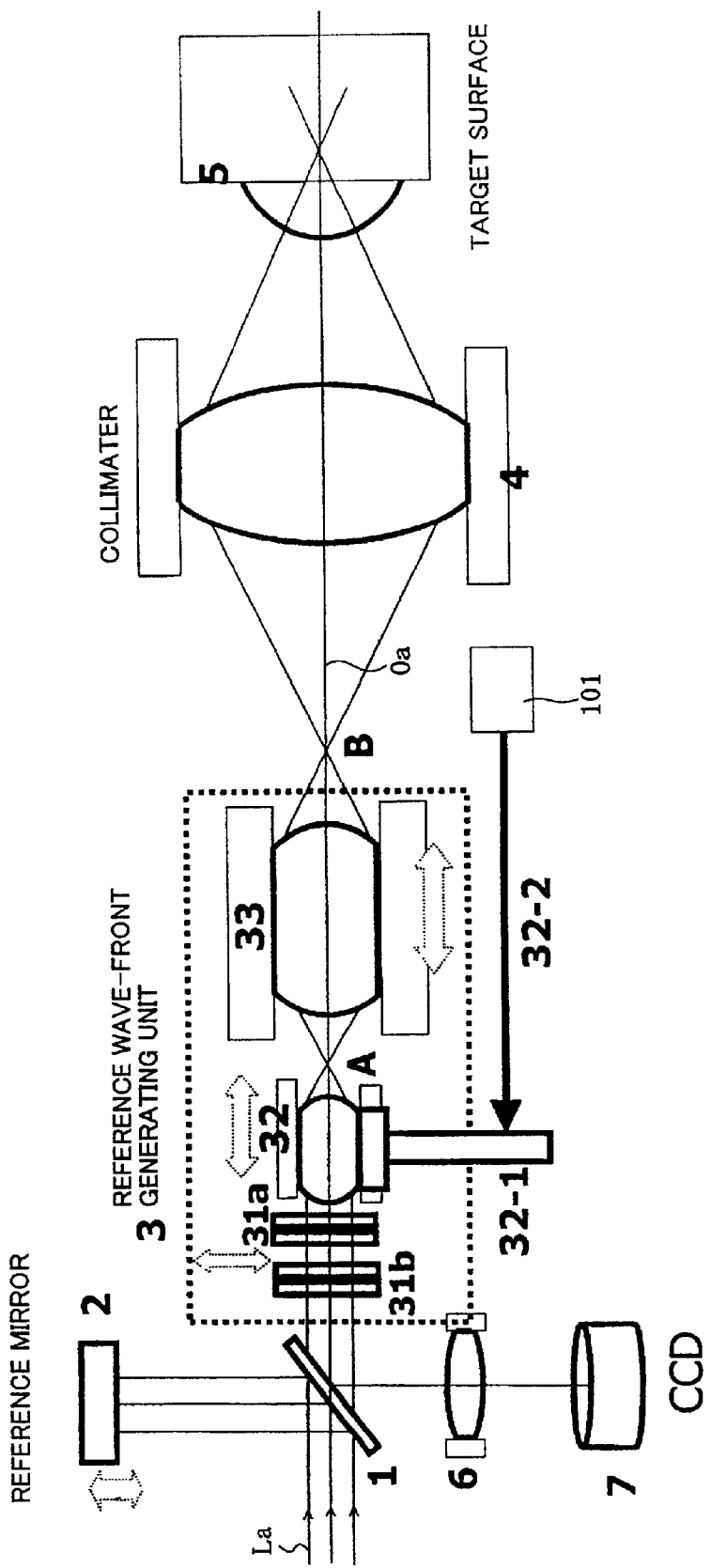
FIG. 1 is a schematic view showing an aspheric surface measurement of a first embodiment according to the present invention.

Normal, spherical-shape measuring interferometers have dramatically developed in precision and measuring reproducibility. The recent reproducibility has shown a precision close to 0.1 nm, which is on a level acceptable to measurement apparatuses in the EUV era.

On the other hand, despite a demand of measurements of aspheric surfaces, measurement methods, e.g., those using a null lens method and CGH, have not yet met a precision requirement due to their many erroneous factors. The instant embodiment of the present invention characteristically eliminates this difference in precision between a spherical-surface measurement and an aspheric-surface measurement. Specifically, the present invention attempts to improve a target value in precision for the aspheric-surface measurement up to that for the spherical-surface measurement, and employs a structure that measures aspheric surfaces based on an optical arrangement for the spherical-surface measurement.

Here, according to the instant embodiment, an aspheric surface means that is symmetrical with respect to an axis and not a spherical surface or plane, or that is symmetrical with respect to a surface and a non-cylindrical surface that is neither a plane nor a cylindrical surface.

Recent development of highly precise drive control and computer in semiconductor manufacturing apparatuses accurately predict aberration to be generated, after each element is driven by an open loop, from a reference position, only when aberration at the reference position is recognized. From the foregoing and a fact that an aspheric surface is defined from an offset from a spherical surface, the present embodiment regards an aspheric surface as aberration, and employs a structure that uses an aberration generating optical system (or reference wave-front generating unit) to generate an aberration amount, thereby generating a wave front having a desired aspheric shape. In other words, the instant embodiment of the present invention characteristically produces an aspheric wave front accurately by means of synthesis.

In addition, where an aspheric surface amount of a target surface is large and a change at a peripheral of a surface is fast, one embodiment easily generates a spherical or aspheric reference wave front by dividing a target surface into a plurality of segments and controlling aberration of an optical system for each segment, even when it is difficult to generate a reference wave front for an entire aspheric surface.

In generating a reference wave front, one embodiment structurally maintains a width of a simultaneously measurable strap to be sufficiently large, particularly at a peripheral of a surface, and independently controllably forms each order of an aspheric shape that characterizes an aspheric surface. This improves accuracy due to the reduced number of measurement times necessary for a surface shape or a measurement with a plurality of superimposed straps.

In dividing into segments, an offset amount between a reference wave front of an aspheric surface to be generated and a surface shape of a target surface does not exceed 10 times wavelength of light used for the measurement. The instant embodiment utilizes an Alvarez lens as a method for independently controlling aberration for each order of a distance from an optical axis (or moving radius) r. An aspheric surface amount controlled by the Alvarez lens is maintained within at most 20 times, usually 10 times measuring wavelength.

A description will now be given of each embodiment according to the present invention, with reference to the accompanying drawings.

FIG. 1 is a schematic view of essential part of a first embodiment according to the present invention, and shows a measurement method of surface information of an aspheric surface as a surface to be measured or a target surface. An interferometer for measuring a shape of a surface to be measured has a structure known as a Twyman-Green interferometer. FIG. 1 shows that light La, which has been emitted from a laser light source (not shown) and collimated (or made parallel), enters the interferometer. The laser source may use known laser, such as HeNe, Ar, HeCd, and a harmonic component of YAG.

In FIG. 1, a beam splitter 1 initially divides a wave front of the collimated light into two, i.e., reflected light (or reference light) and transmissive light (or signal light). As illustrated, the optical path is accordingly divided into an optical path (or reference optical path) through which the reference light goes to a reference mirror 2, and an optical path through which light goes to an object (or surface to be measured) 5. The light that has gone to the reference optical path reflects at the reference mirror 2, and returns to the beam splitter 1. The high measurement accuracy essentially requires a phase measurement, and an approach called a Phase Measuring Interferometer ("PMI") is applied. For example, FIG. 1 shows an exemplary structure that minutely drives the reference mirror 2 in a direction of optical axis (or arrow) in wavelength order. Part including the reference mirror 2 may use the same structure as that of the conventional interferometer.

The optical path towards the target surface (object) 5 is the core in this embodiment. A beam passes the beam splitter 1 and then enters the reference wave-front generating unit 3 for generating a wave front as a measurement reference for the target surface 5. The reference wave-front generating unit 3 may use various structures, but the structure shown in FIG. 1, in principle, generates a wave front corresponding to fourth power of a moving radius R of the wave front by generating spherical aberration through an adjustment of a position in an optical path of an optical system (or optical member) as spherical aberration generating part in the reference wave-front generating unit 3, while this structure generates a higher-order wave front by moving an optical element relative to an optical axis Oa, which is referred to as an Alvarez lens (or Alvarez lens part).

While a structure of an Alvarez lens 31 will be described later, a description will now be given of a method of generating a spherical aberration. In FIG. 1, 32 denotes a first lens, and 33 denotes a second lens. In the structure shown in FIG. 1, the lens 32 forms an image at a point A using collimated light from beam splitter 1. Since it is sufficient for the lens 32 to correct aberration in a very small range near the axis Oa, the aberration amount may be maintained small.

Even when a minute amount of aberration remains for the lens 32, an offset process may easily cancel out the minute amount. The following description assumes that aberration is negligible for the lens 32.

The lens 33 is a lens whose aberration has been properly corrected in view of the infinite object point. For example, it may use an objective lens in a microscope, etc., and its aberration has been properly corrected with respect to a positional relationship with an object image. An image formed by the lens 33 includes much aberration in the positional setup deviated from a predetermined arrangement. Since interferometers use only on-axial optical arrangement, aberration generated due to a shift from the predetermined relationship is of rotational symmetry around the optical axis, that is, the spherical aberration. When the image forming point A formed by the lens 32 accords with an object point for which the aberration of the lens 33 should be corrected, the aberration would be corrected well at the image forming position, which is formed after passing through the lens 33. A point B in FIG. 1 is a position where aberration of subsequent collimator (or collimator lens) 4 is best corrected. When the point B accords with lens 33's image forming position, all the optical elements in the structure shown in FIG. 1 are arranged in a state where aberration is the least. In this way, where aberrations of the lenses 32, 33 and collimator 4 are best corrected, an arrangement of the interferometer shown in FIG. 1 is defined as a "reference state".

A detailed description will now be given of the reference state: The light, by which the lens 33 forms an image at the point B, enters the collimator 4, and then goes to the target object 5 while converted from a divergent wave to a convergent wave by the collimator 4. The collimator 4 is an optical system whose aberration has been corrected with respect to the point B. Thus, the convergent wave has a wave front that has little or no aberration, and goes to the target object 5. In the reference state, the target surface is arranged suitable for a spherical measurement. An offset of aberration in the measurement optical system from the lens 32 to the collimator 4 may be calculated when a previously identified reference spherical surface is arranged as the target object in the reference state. Again, the reference state makes an arrangement of the target surface suitable for a spherical measurement, and serves to obtain an offset of the measurement system. An offset may be obtained as proposed by "Optical Shop Testing" (edited by Malacara), etc., and a detailed description thereof will be omitted.

A description will now be given of a measurement of an aspheric surface as a surface to be measured. The instant inventor has discovered through an analysis of aspheric surfaces as a measurement object that it is efficient for an aspheric shape in a rotational-symmetry type optical system to approximate in order from a low order starting with fourth power, sixth power, eighth power, tenth power, of the moving radius R of the wave front. Therefore, it is one of the features of the instant embodiment to synthesize the moving radius R of the wave front in order from a low order starting with fourth power, sixth power, eighth power, tenth power, . . . in producing a reference wave front until it comes to be in a measurable range. In addition, it is another feature of the instant embodiment to use a variable generated amount of fourth power, sixth power, eighth power, tenth power, . . . , of the moving radius R of the wave front so as to handle various aspheric shapes.

The first embodiment shown in FIG. 1 is directed to a structure that generates the spherical aberration corresponding to a term of the fourth power of the moving radius R of the wave front, which is the lowest order in the aspheric surface. The spherical aberration is generated in accordance with the following procedure: The lens 33's aberration at the point B is corrected only when the image forming point A for the lens 32 is located at a predetermined object point. Therefore, as the lens 32 is moved in an optical-axis direction and a position of the point A is shifted from a position for eliminating the lens 33's aberration, an image forming position is offset from the point B, generating the spherical aberration.

Figure 2:
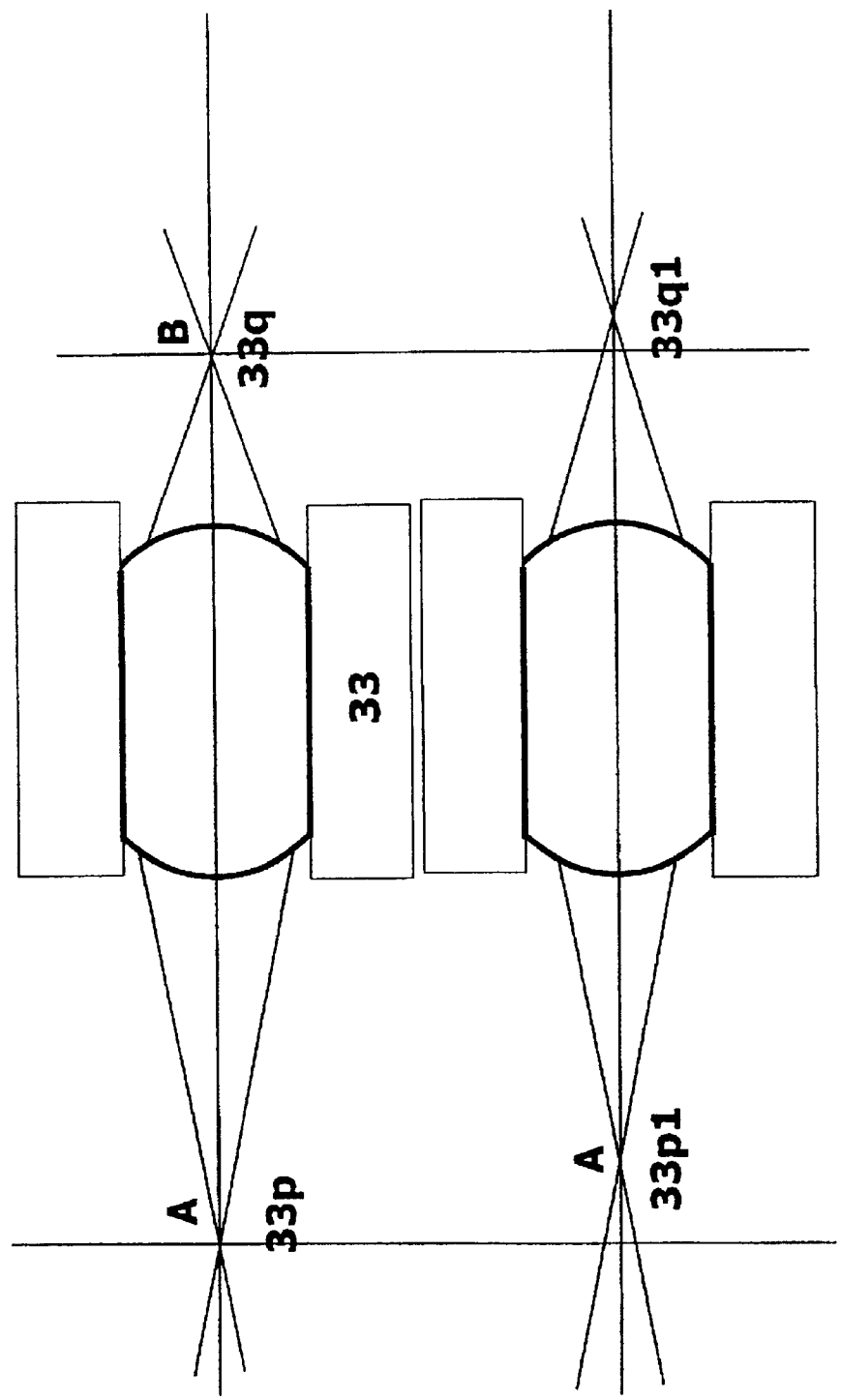
FIG. 2 is a view showing a generation of spherical aberration.

FIG. 2 shows this transition. FIG. 2A shows a lens arrangement for correcting the lens 33's aberration, in which an image forming position A formed by the lens 32 forms an image at a point 33p in which the lens 33's aberration is eliminated, and the lens 33 forms an image at a point 33q. In the reference state, the point 33q accords with the object point position B where collimator 4's aberration is corrected. The image forming position A is then moved to a point 33p1 by moving the lens 32 to the right in the optical-axis direction and, as a result, the image forming position of the point 33p1 by the lens 33 moves to the point 33q1. The spherical aberration occurs since the points 33p1 and 33q1 are not in an aberration-corrected relationship. The instant embodiment uses this spherical aberration as a reference wave front (or surface to be measured). When the lenses 32 and 33 are moved as one member to the light in the optical-axis direction with respect to the collimator 4, lens 33's image forming position accords with the point B while maintaining the generated spherical aberration. Here, the movement as one member results from a parallel beam incident onto the lens 32.

The spherical-aberration generating amount and its sign (i.e., plus or minus) from the reference wave-front generating unit 3 is controllable using a moving amount and moving direction of the image forming point A. Therefore, a term corresponding to the fourth power of the moving radius R of the wave front may be regarded as a variable amount. One of the objects in this embodiment is such highly precise measurement as has accuracy in angstrom order. Strictly speaking, the aberration occurring as a result of positional adjustment between the lenses 32 and 33 does not restrictively depends upon the fourth power of the moving radius R of the wave front, but if positions of the lenses 32 and 33 in the direction of the optical axis are accurately known, the computer may use these values to accurately calculate resultantly generated aberration from low to high order terms. The calculated values, including the high order terms may be used as a value of the reference wave front.

The system shown in FIG. 1 uses a laser interferometer 101 as monitor part for monitoring a position of lens 32's lens-barrel. More specifically, the laser interferometer 101 emits light 32-2 in order to monitor a position of a mechanical part 32-1 for moving the lens 32's lens-barrel. Instead of the laser interferometer, a position-detecting element may be used, such as a magnetic scale and an encoder, and calculation using this monitor function provides a generated aberration amount accurately.

The laser interferometer may monitor only lens 32's relative deformation amount, and it is necessary to determine a reference position. The above "reference state" is used to determine the reference position. An optical system is placed in the reference state, and an identified reference spherical surface is placed at the target object position. In this state, positions of the lens 32, 33, collimator 4, and the reference spherical surface are adjusted so that aberration becomes closest to data of the identified reference spherical surface. Positional adjustments end among the lenses 32, 33, and lens 4 when they are in a permissible value range as a result of the adjustment. This position becomes a reference position of the position-detecting element (or the laser interferometer 101). The aberration generating amount given by a drive amount from the reference position may be accurately calculated with a precision determined by the drive amount. The precision accuracy in nano meter order is available with the laser interferometer 101, and it is accuracy enough to know the aberration.

While FIG. 1 shows the way of detecting lens 32's position in an optical-axis direction, there are provided similar means for detecting positions of other optical elements, such as 32 and 33.

An actual aspheric surface is not indicated only by a term of the fourth power of a moving radius R of the wave front, but requires an introduction of higher order terms. Aberration generated in the above positional adjustments among the optical elements 32, 33, and 4 corresponds to a generating pattern of the fourth power of the moving radius R of the wave front. It is difficult for the mere positional adjustment to freely control sixth-order or higher aberrations to form an aspheric reference wave front.

Figure 3:
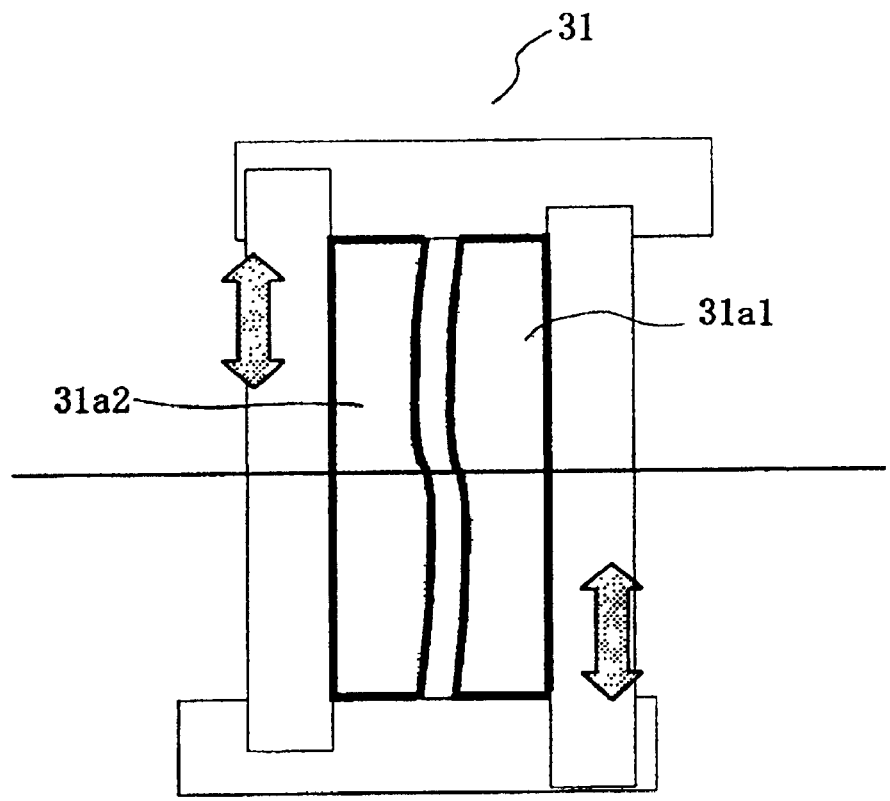
FIG. 3 is a principal view of an Alvarez lens.

The instant embodiment generates aberration having a high-order shape existing in an actual aspheric surface, and characteristically uses the Alvarez lens 31, as shown in FIG. 3. The Alvarez lens includes a pair of lenses 31a1 and 31a2 having the same shape, as shown in FIG. 3, and arranges aspheric surfaces shown by f(x, y), opposite to each other. When the relative offset between two lenses 31a1 and 31a2 in the x-y plane is zero, the Alvarez lens serves as a plane plate. With a proper selection of a shape of f(x, y), the high order aberration may be freely generated by driving one of two lenses 31a1 and 31a2 by $\Delta$ in a direction y perpendicular to a direction of the optical axis Oa, and the other by $-\Delta$.

For instance, when it is assumed that a shape of the Alvarez lens f(x, y) which provides a feature of the sixth power by offsetting in the direction y is defined as $$f(x, y) = a\left(x^6 y + x^4 y^3 + \frac{3}{5}x^2 y^5 + y^7/7\right),$$

a transparent wave front W(x, y) of an Alvarez lens which is offset in the direction y by ±Δ is defined as W(x,y)≈2aΔ(n−1)($\sqrt{x^2+y^2}$)$^6$, where n is a refractive index of a glass material, thereby forming a wave front proportional to the offset amount Δ. As discussed, when the offset amount Δ is formed symmetrically with respect to plus and minus, terms of even orders disappear and nonlinear effect of the offset amount Δ may be avoided. Control over the offset amount Δ would adjust the generated aberration amount.

It is difficult to ideally manufacture an aspheric shape f(x, y) that characterizes the Alvarez lens 31, and thus manufacturing errors need to be calibrated. In calibration, the offset amount is calculated through a measurement with a reference state and an identified reference surface, as in the spherical aberration. An offset amount including an error of f(x, y) and a nonlinear effect generated from the offset amount Δ, etc. is corrected. A position of the Alvarez lens is detected by attaching a position-detecting element to each Alvarez lens.

Although a description have been given of a term of the sixth power of a moving radius R of a wave front, terms of the eighth power and tenth power would be controllable by an insertion of plural Alvarez lenses. The number of Alvarez lenses to be inserted differs according to a shape of a target aspheric surface. In the system shown in FIG. 1, 31*a* corresponds to an Alvarez lens for generating a term of the sixth power and 31*b* corresponds to an Alvarez lens for generating a term of the eighth power.

Thus, the above structure of this embodiment uses the beam splitter 1 to synthesize a reference wave front through the reference mirror 2 and the target surface (or signal wave front) that has passed through the reference wave-front generating unit 3 and the collimator 4, reflected at the target surface 5, and returned along the original optical path. The inventive structure uses the lens 6 to form an interference wave front on an image-pickup means 7, such as a CCD, and measures a surface shape (surface information) of the target surface 5 using a signal (or interference signal) from the image-pickup means 7.

Thus, the instant embodiment enables the interferometer to easily detect a shape of an arbitrary aspheric shape surface without CGH or any other element, such as a null lens. Therefore, the reference wave front is generated to measure a shape of an aspheric surface by controlling aberration in the optical system (or reference wave-front generating unit).

In forming a reference wave front as a measurement reference of a shape of an aspheric surface, the instant embodiment forms each independently controlled order of an aspheric shape that features an aspheric surface. The target optical system is often co-axial, and thus an optical element often has a rotational symmetry. Therefore, an offset from a spherical surface is usually represented by terms of even orders higher than the fourth power of R where R is a distance from an optical axis (or the moving radius).

A term of R's fourth power is particularly important, and a term of the fourth power corresponds to spherical aberration. Accordingly, the spherical aberration is intentionally generated by a desired value so as to form a wave front corresponding to a component, which the aspheric shape possesses. However, in general, it is often difficult to represent the aspheric surface using only by R's forth power. Accordingly, controllable aberrations are generated so as to synthesize a wave front that constitutes a desired aspheric surface by using the Alvarez lens for each order with respect to terms of higher orders than the fourth power. The Alvarez lens may generate all the wave fronts higher than the fourth order.

The instant embodiment adjusts and synthesizes wave fronts, and may prepare various reference wave fronts, thereby releasing troubles to prepare CGH or a null lens for each aspheric shape. Therefore, advantageously, it is possible to measure various aspheric surfaces with this extremely general-purpose apparatus itself as a reference. In addition, this flexible interference measurement method may provide the same accuracy as the spherical-surface measurement, and easily measure aspheric surfaces, which have been difficult to be measured with high precision.

Figure 4:
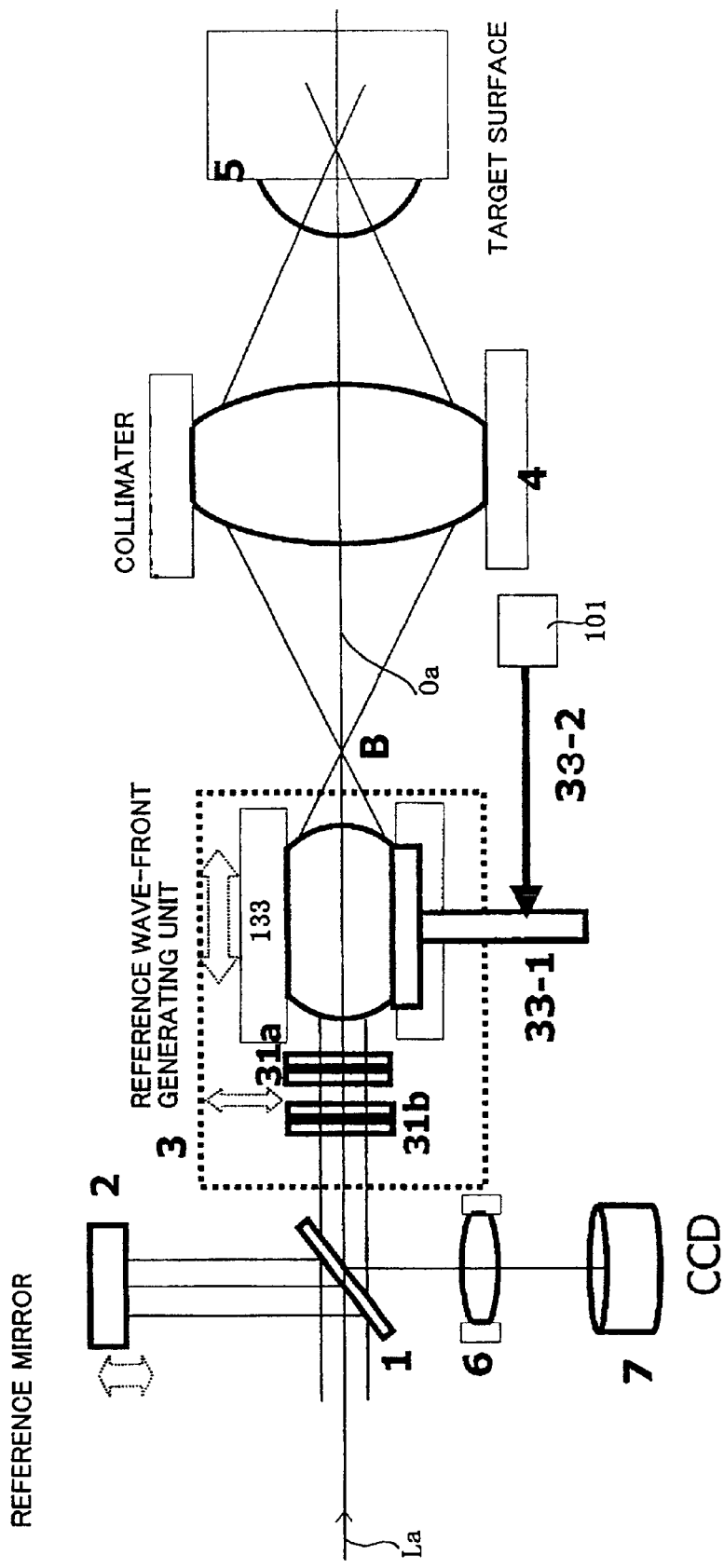
FIG. 4 is a schematic view showing an aspheric surface measurement of a second embodiment according to the present invention.

FIG. 4 is a schematic view of essential part of the second embodiment according to the present invention. This embodiment differs from the first embodiment shown in FIG. 1 in the way of generating spherical aberration by the reference front-wave generating unit 3. Other than that, the instant structure is the same as the first embodiment.

A lens 133 in the reference wave-front generating unit 3 in this embodiment serves to generate aberration for incident collimated light. FIG. 5A shows a system for controlling a spherical-aberration generating amount by controlling a separation between two lenses 133*a* and 133*b* in the lens 133. A change of the image forming position with a change of separation d is adjusted by moving the entire lens 131. As in the first embodiment, a reference position of the separation d utilizes a similarly calculated reference state using the lens 133, collimator 4, and reference spherical surface.

FIG. 5B shows an example, which inserts two prisms (or wedges) 134 and 135, which serve a parallel plane as a whole and may continuously change a thickness at a rear position of the lens 133. FIG. 5C shows an example, which controls spherical aberration by discretely changing a plurality of parallel planes 136 and 137. In order to make a thickness of the parallel plane variable, a combination of two, similarly angled wedges 134 and 135 is moved in a direction orthogonal to the optical axis Oa. The reference position in this case is adjusted, similar to the first embodiment, by once realizing the reference state. In case of a parallel plane shown in FIG. 5C, generated spherical aberration is calculated through use of an accurate measurement of a thickness of the plane.

Figure 6:
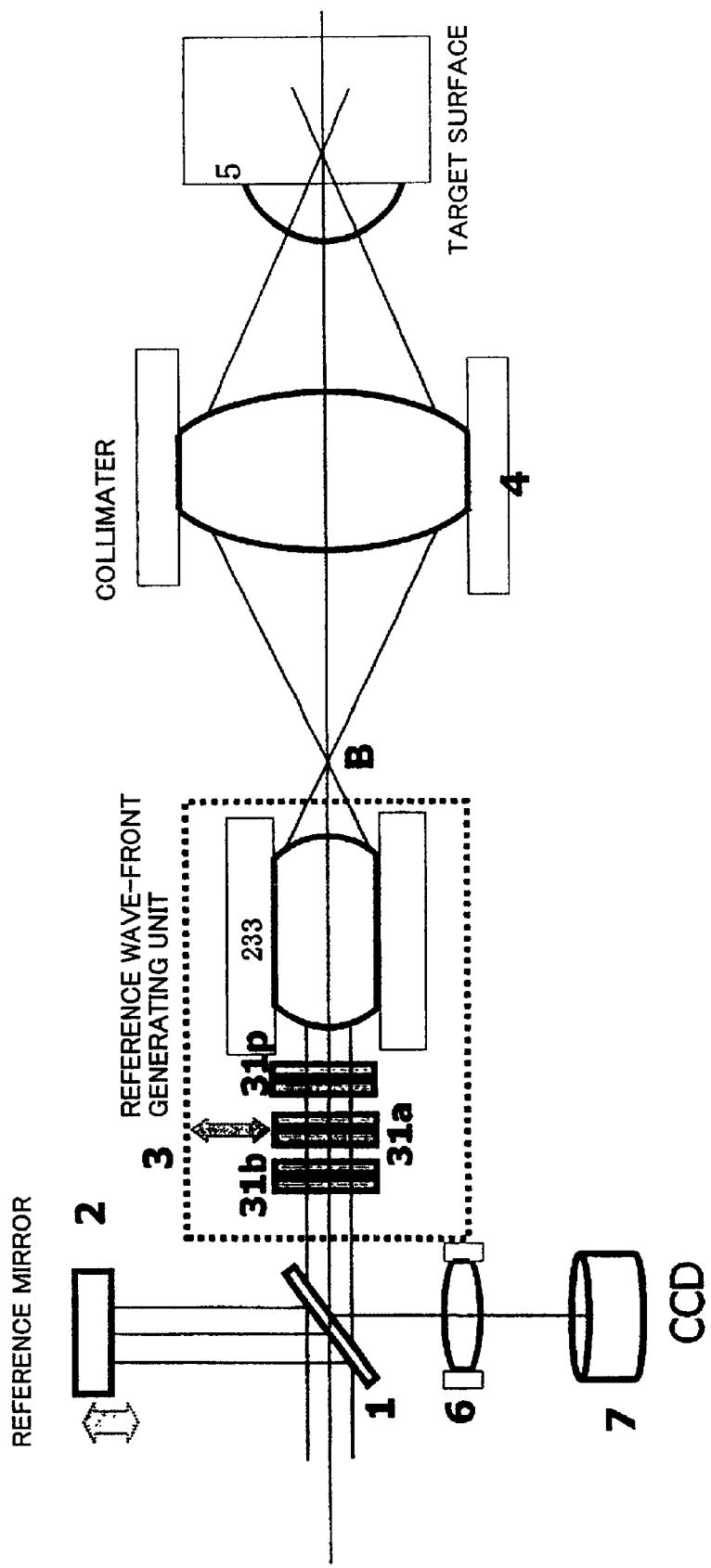
FIG. 6 is a schematic view showing an aspheric surface measurement of a third embodiment according to the present invention.

FIG. 6 is a schematic view of essential part of a third embodiment according to the present invention. This embodiment differs from the first embodiment shown in FIG. 1 in that the Alvarez lens controls generating of all the aberrations without using the reference front-wave generating unit 3. Other than that, the instant structure is the same as the first embodiment.

A lens 233 in this embodiment serves to form an image using collimated light without aberration. As illustrated, the Alvarez lens 31*p* controls the generating amount of spherical aberration proportional to the fourth power of a moving radius R of a wave front. As in the first embodiment, a reference position of the Alvarez lens utilizes a similarly realized reference state using the lens 233, collimator 4, and reference spherical surface, and calculates an offset by inserting the Alvarez lens. Operations of other Alvarez lenses 31*a* and 31*b* are similar to those in the first embodiment.

Figure 7:
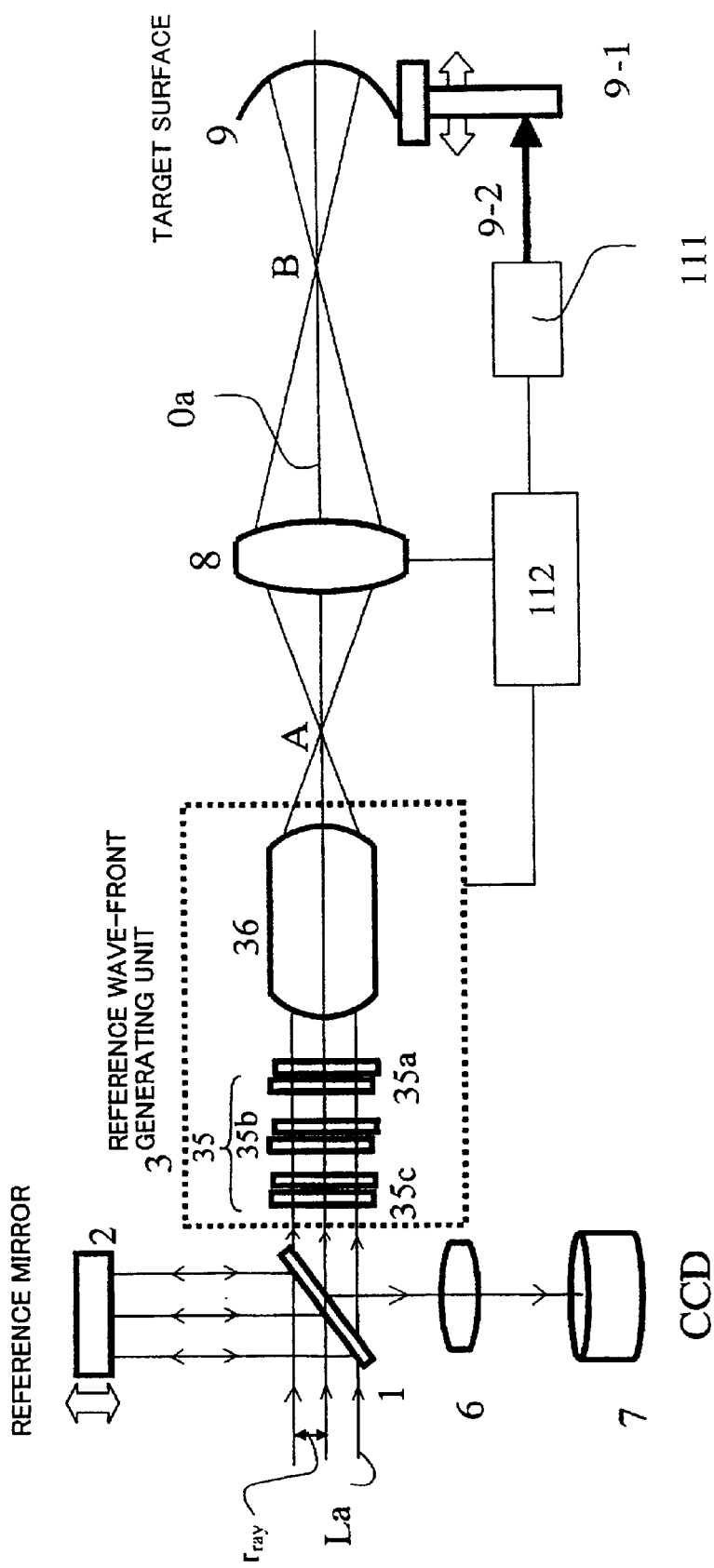
FIG. 7 is a view for explaining an aspheric-surface measurement method of a fourth embodiment according to the present invention.

FIG. 7 is a schematic view of essential part of a fourth embodiment according to the present invention, and shows a measurement method of surface information of an aspheric surface as a surface to be measured or a target surface. An interferometer for measuring a shape of a surface to be measured has a structure known as a Twyman-Green interferometer. FIG. 7 shows that light La, which has been emitted from a laser light source (not shown) and collimated (or made parallel), enters the interferometer, and the laser source may use known laser, such as HeNe, Ar, HeCd, and a harmonic component of YAG.

In FIG. 7, a beam splitter 1 initially divides the collimated light into two in its wave front, i.e., reflected light (or reference light) and transmissive light (or signal light). As illustrated, the optical path is accordingly divided into an optical path (or reference optical path) through which the reference light goes to a reference mirror 2, and an optical path through which light goes to an object (or surface to be measured) 9. The light that has gone to the reference optical path reflects at the reference mirror 2, and returns to the beam splitter 1. Since the highly precise measurement accuracy essentially requires a phase measurement, an approach called a Phase Measuring Interferometer ("PMI") is applied. For example, FIG. 1 shows an exemplary structure that minutely drives the reference mirror 2 in a direction of optical axis (or arrow) in wavelength order. Part including the reference mirror 2 may use the same structure as that of the conventional interferometer.

The beam splitter 1 synthesizes reference light and object light from the target surface 9, so as to form interference information on an image-pickup means (observation surface) 7 through a lens 6, thereby enabling the target surface 9 to be measured.

The optical path towards the target surface (object) 9 is the core in this embodiment. A beam that has passed the beam splitter 1 then enters the reference wave-front generating unit 3 for generating a wave front as a measurement reference for the target surface 9. The reference wave-front generating unit 3 includes Alvarez lenses 35a, 35b, and 35c, and a condenser lens 36.

While a structure of the Alvarez lens 35 will be described later, and a description will now be given of the condenser lens 36. In the structure shown in FIG. 7, the lens 36 serves to form an image at a point A using incident approximately collimated light from beam splitter 1 through Alvarez lenses 35a, 35b, and 35c. Since it is sufficient for the condenser lens 36 to correct aberration in a very small range near the axis Oa, the aberration amount may be maintained to be extremely small. Even when a minute amount of aberration remains for the condenser lens 36, an offset process may easily cancel out the minute amount. The following description assumes that aberration is negligible for the condenser lens 36.

Next, light that has passed through the reference wave-front generating unit 3 enters a zoom lens 8. The zoom lens 8 is used to change, through zooming, a width of a beam (segment) incident upon a measurement area on the target surface 9. The zoom lens 8 is a lens whose aberration has been properly corrected in view of the infinite object point, and forms an image at a point B using light that has been converged at the point A. Similar to the condenser lens 36, aberration for the zoom lens 8 has been corrected to the extent that the aberration is negligible but, in some case, intentional aberration may be given for use with a formation of a shape of aspheric wave front.

In this way, the collimated light La incident upon the Alvarez lenses 35a, 35b and 35c, which serve as a parallel plane unless they are driven, forms, as a converged wave with almost no aberration, an image at the point B through the condenser lens 36 and zoom lens 8. This embodiment defines this state as a reference state. The reference state is preferable in an attempt to measure a shape using a spherical surface that has been located at the target surface 9. Each of the points A and B may be located at different positions in the reference state for each zoom state of the zoom lens 8, but an arrangement between the condenser lens 36 and the zoom lens 8, and generated wave fronts in that case should be recognized.

Figure 8:
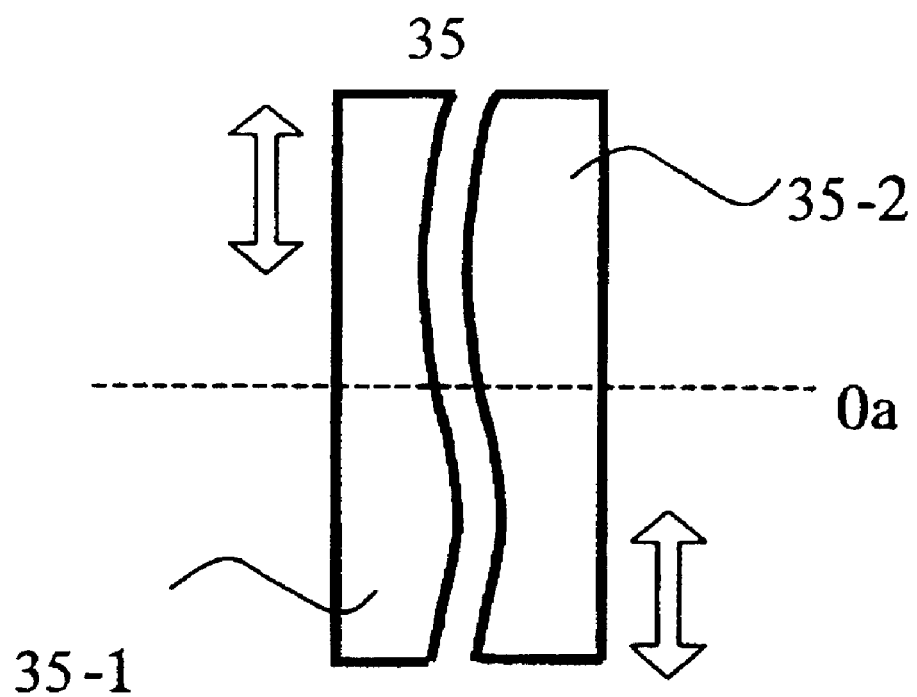
FIG. 8 is a principal view of Alvarez lenses.

In order to generate a measuring reference wave front of an aspheric surface, the instant embodiment characteristically uses the Alvarez lens 35. The Alvarez lens combines, for use, a pair of lenses 35-1 and 35-2 having the same shape, as shown in FIG. 8. One side of each of the lenses 35-1 and 35-2 forms an aspheric surface shown by f(x, y), and aspheric sides are arranged close and opposite to each other. When a relative positional offset between two lenses 35-1 and 35-2 in the xy surface is zero, the Alvarez lens 35 serves as a plane plate. On the other hand, when one of two lenses 35-1 and 35-2 is shifted by Δ in a direction y perpendicular to a direction of the optical axis Oa, and the other by −Δ, a transparent wave front W(x, y) of the Alvarez lens 35 is approximated by the following equation (4) where n is a refractive index of a glass material of each of the lenses 35-1 and 35-2:

$$W(x, y) \approx 2\Delta(n-1)\frac{\partial f(x, y)}{\partial y} \quad (4)$$

With a proper selection of a surface shape f(x, y), aberration of each order may be freely generated. A distance r from an optical axis is expressed as $r^2=x^2+y^2$, and surface shapes necessary to generate aberrations of the fourth, sixth, and eighth powers of the distance r are expressed as follows:

$$f(x, y) = c_4\left(x^4y + \frac{2}{3}x^2y^3 + \frac{1}{5}y^5\right) \quad (5)$$

$$f(x, y) = c_6\left(x^6y + x^4y^3 + \frac{3}{5}x^2y^5 + \frac{1}{7}y^7\right) \quad (6)$$

$$f(x, y) = c_8\left(x^8y + \frac{4}{3}x^6y^3 + \frac{6}{5}x^4y^5 + \frac{4}{7}x^2y^7 + \frac{1}{9}y^9\right) \quad (7)$$

For example, these surface shapes f(x, y) are given to the Alvarez lenses 35a, 35b, and 35c shown in FIG. 7, components of the fourth, sixth, and eighth orders of the distance r from the optical axis may be independently controlled.

The above description assumes an axial symmetry and, $r^2=y^2$ in case of a surface symmetry, when the symmetrical surface is a surface including an X-axis and an optical shaft. This corresponds to a case of an axial symmetry with x=0, and a surface shape given to the Alvarez lens is defined by substituting 0 for x in the equations for the axial symmetry.

The above description addresses only the fourth, sixth, and eighth orders of the distance r, but terms of second, tenth and higher orders are controllable by inserting Alvarez lenses having other surface shapes. Orders to be controlled differ according to aspheric surface as a measurement target.

It is difficult to ideally manufacture an aspheric shape f(x, y) that characterizes the Alvarez lens 35, and thus manufacturing errors need to be calibrated. In calibration, the offset amount is calculated through a measurement with a reference state and an identified reference surface, as in the spherical aberration. An offset amount including an error of f(x, y) and a nonlinear effect generated from the offset amount Δ, etc. is corrected. A position of the Alvarez lens is detected by attaching a position-detecting element to each Alvarez lens.

A value of the wave front $W(x, y)$ controlled by the Alvarez lens, i.e., an aspheric surface amount depends upon a product of coefficients ($C_4$, $C_6$, $C_8$ etc.) of $f(x, y)$ and a shift amount $\Delta$. An independent control of a component of each order for a distance r from the optical axis becomes difficult where coefficients of $f(x, y)$ are too large, resulting in large refractive influence, and where a shift amount is too large, deteriorating an accuracy when a difference is differentially approximated. As a result, the controllable wave front $W(x, y)$ has a limited value. According to an analysis on the Alvarez lens by the instant inventor, where the transparent wave front $W(x, y)$ has a control object that has been set to about 10–20 times wavelength of measurement light, it is possible to make approximately independent a component of each order with respect to the distance r from the optical axis.

On the other hand, an increased target value of an aspheric surface amount to be generated in each Alvarez lens would apparently break independency, and result in difficult control only by a sum of each order where a plurality of Alvarez lenses are inserted into the same optical path. Therefore, it is preferable to set up the target value below twenty times, normally about ten times a wavelength of the measurement light. When controls by these Alvarez lenses lose independency, it is conceivable to use the zoom lens 8 to generate aberration as an aberration correcting method, although this method results in lowered flexibility in addition to a complicated system.

A description will now be given of a circumstance of measuring an aspheric shape so that the maximum radius r=55 where c=1/R=−0.002, K=0.8, A=1.1e−8, B=− 2.5e−13, C=1.2e−18, D=4.0e−22 in the equation (1). When a wavelength of light for use with a measurement is 656.3 nm, an aspheric surface amount is 86.5 μm as a difference $\delta$ from a spherical surface having the same curvature as the aspheric surface in the equation (1), i.e., $\delta=131.8\lambda$, at a position with the maximum radius r=55. When it is assumed that $10\lambda$ is a measurable aspheric amount by a usual method, rough calculation shows that a division into fourteen segments is required and the interval becomes narrow toward the outer circumference, like strap's interval in Fresnel lens.

When a surface shape near the optical axis is considered, $\delta=10\lambda$, when $r_0=28.466$. Therefore, a measurement may use a usual method in the range of $r<r_0$. Now the following case is considered: the Alvarez lens 35a is shifted in FIG. 7, and only a term of fourth order of the distance r is controlled using the target value $10\lambda$. It may be considered that a vicinity of the optical axis is subject only to influence of fourth order of the distance r. If it is assumed that up to $\delta=20\lambda$ becomes measurable by driving the Alvarez lens 35a, the position is $r_1=33.925$. In order to actually realize this using the system shown in FIG. 7, it is necessary to shift the Alvarez lens 35a, to generate an aspheric wave front, to calculate a distance $r_{ray}$ from the optical axis Oa of the incident ray with the aspheric amount of $10\lambda$ as a control target value, to zoom using the zoom lens 8 so that a ray with a height $r_{ray}$ may reach a position with a distance $r_1$ on the target surface 9. The aspheric wave front as this measurement reference may be identified by data from the position detecting apparatus and the wave front in the reference state, the surface shape may be calculated based on the measured interference fringe.

Figure 9A:
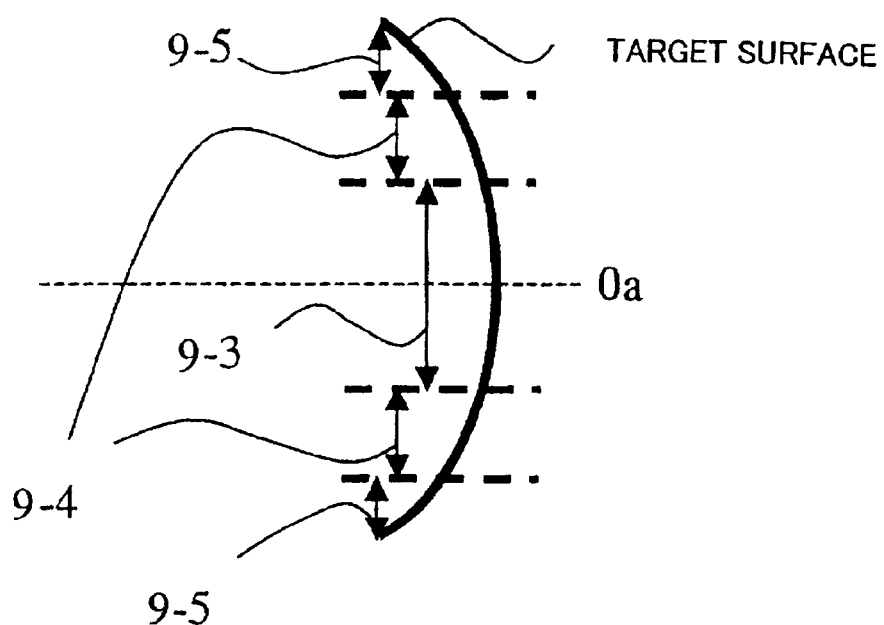
FIG. 9 is a view for explaining a method of dividing a surface to be measured.
Figure 9B:
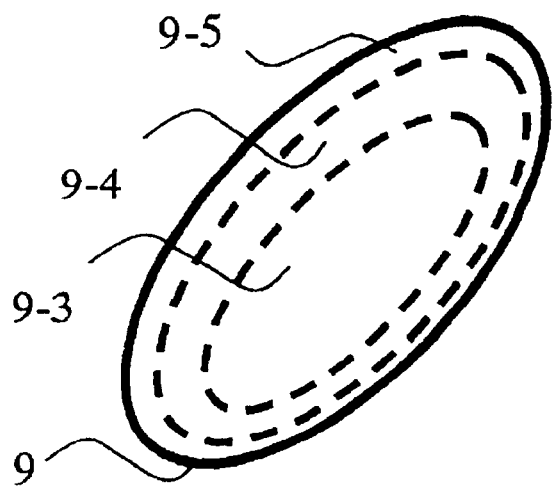

Thus, compared with no control of the Alvarez lens 35a, a center part may be measured in a broader range. This center part corresponds to measurement segment 9-3 in FIGS. 9A and 9B. In measuring the measurement segment 9-3, the Alvarez lenses 35b and 35c may be shifted. Use of this degree of freedom would maintain small an offset amount $10\lambda$ between the aspheric wave front as the measurement reference and the measured surface.

Figure 10:
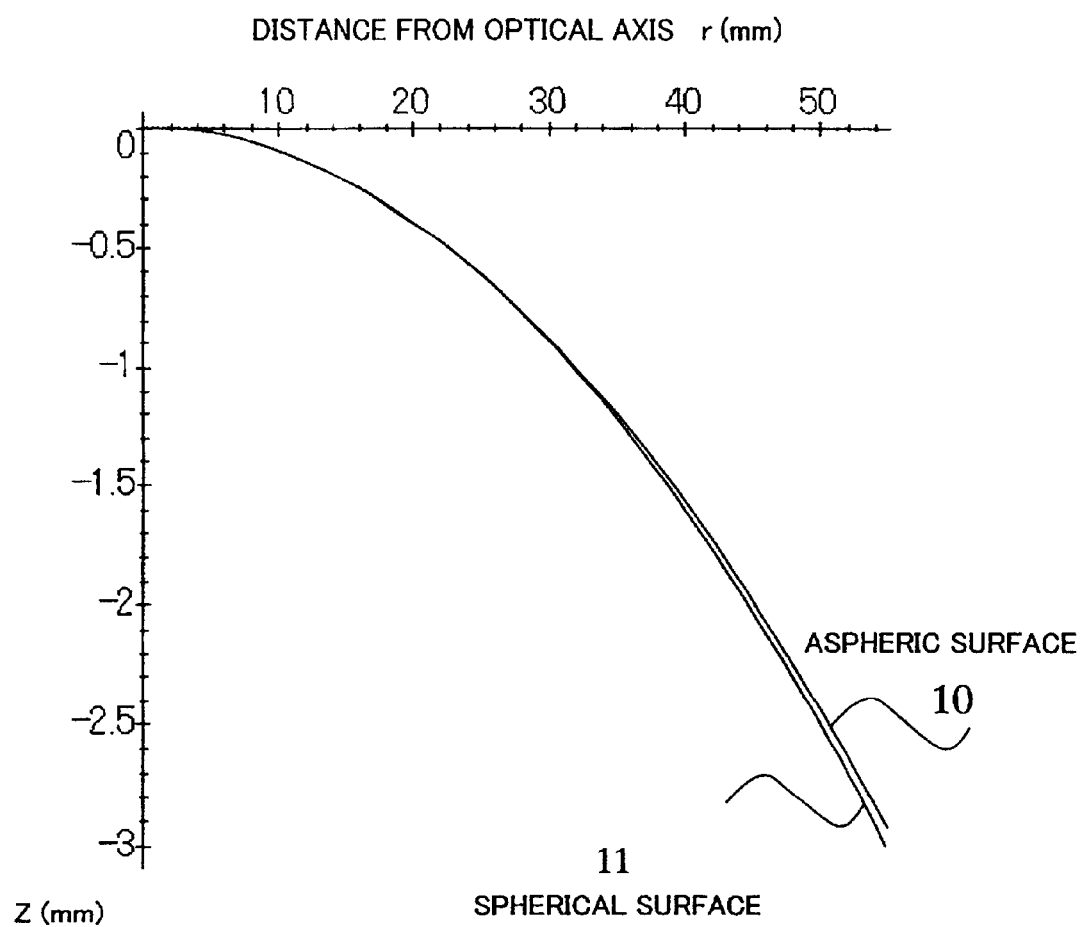
FIG. 10 is a view for explaining a numerical example of the surface to be measured.

Next follows a description of a measurement method of the measurement segment 9-4 on the target surface 9 shown in FIG. 9. FIG. 10 shows a numerical example of the target surface 9. The target surface 9 is expressed by this numerical example, the curvature at the peripheral of the surface is loose compared with the center part, as shown in FIG. 10. Therefore, it is sufficient to loosen curvature at a spherical component in the aspheric wave front as a measurement reference, for example, c'=1/(R−8.70)=−0.00197 or so. For this purpose, a position of the target surface 9 is shifted in the direction of optical axis Oa. More specifically, the laser interferometer 111 emits light 9-2 in order to monitor a position of a mechanical part 9-1 for moving the target surface 9. Instead of the laser interferometer, a position-detecting element may be used, such as a magnetic scale and an encoder, and calculation using this monitor function provides a spherical component of a wave front hitting the measurement segment 9-4 accurately.

When an offset amount is zero from a spherical surface at the distance $r_1$ after the curvature of the surface shape is corrected, an offset position $r_2=41.975$ of $10\lambda$, but up to $r_3=47.5$ enters an offset range of $10\lambda$ by shifting the Alvarez lenses 35a and 35b and controlling terms of fourth and sixth orders of the distance r for $10\lambda$. It is unnecessary to shift the Alvarez lens 35c, but such a shift would narrow the offset range. Thereafter, by zooming using the zoom lens 8, the incident beam La is adjusted so as to expand up to a position of distance 47.5 from the optical axis Oa on the target surface 9.

An aspheric wave front generated in this case is calculated and determined using the operational means 112 with data of the position detecting element loaded to the Alvarez lenses 35a and 35b, data of an arrangement of the zoom lens 8, and data of a position of the target surface 9, whereby the measurement of the interference fringe may measure a surface shape of the segment 9-4.

A description will now be given of a measurement method of measurement segment 9-5 on the target surface 9 shown in FIG. 9. The basic procedure is the same as that for a measurement method of the measurement segment 9-4: the curvature of a spherical component in the aspheric wave front as a measurement reference is initially changed by shifting a position of the target surface 9 in the optical-axis direction. For example, c"=1/(R−12.6)=−0.00195 or so. In this case, a positional offset amount is monitored using the laser interferometer 111.

Next, the Alvarez lenses 31a, 31b and 31c are shifted so that they each control the target value $10\lambda$ while an offset amount from the spherical surface at a position of $r_3=47.5$ is set to be zero. When the incident beam La is expanded on the target surface 4 up to a distance from the optical axis r=55, an offset amount between the generated aspheric wave front and the target surface 9 is almost within $10\lambda$. Thus, a shape of the target surface 9 may be obtained through the interference measurement by measuring an offset amount $\delta$ from the aspheric wave front on the target surface 9, and calculating a shape of the aspheric wave front using from arrangement data of the Alvarez lenses 35a, 35b, and 35c, zoom lens 8, and target surface 9.

As discussed, the instant embodiment reduces the number of divided measurement segments on the target surface in measuring the aspheric shape, and reduces the number of connections for measurements with higher precision. The instant embodiment also uses an expanded width of measurement segments to superimpose them in dividing into segments, so as to make a correction more accurately. Although the instant embodiment limits controlled components by the Alvarez lenses only to the fourth, sixth, and eighth orders of the distance r from the optical axis, but Alvarez lenses for components of second, tenth and higher orders may be adopted depending upon the measurement object. Use of them would reduce an offset amount between the target surface and the reference wave front in the segment, and provide an interference measurement with high precision.

Thus, the above structure of this embodiment uses the beam splitter 1 to synthesize a reference wave front through the reference mirror 2 and the target surface (or signal wave front) that has passed through the reference wave-front generating unit 3 and the zoom lens 8, reflected at the target surface 9, and returned along the original optical path; uses the lens 6 to form an interference wave front on an image-pickup means 7, such as a CCD; and measure a surface shape (surface information) of the target surface 5 using a signal (or interference signal) from the image-pickup means 7.

An optical element manufactured using one of the interferometers of the above embodiments is applicable to a projection optical system in a projection exposure apparatus, which exposes a pattern formed on a first object (or reticle) on a second object (or wafer). Thereby, a projection optical system with high optical performance is manufactured easily.

As described, each embodiment of the present invention adjusts and synthesizes wave fronts, and easily produces various reference wave fronts without CGH or a null lens for each aspheric shape. Since the apparatus itself may be used as a reference and thus a master standard. Each embodiment of the present invention variably controls a wave front generated as a reference with high precision, and flexibly measures various aspheric shapes. In addition, this flexible interference measurement method may provide the same accuracy as the spherical-surface measurement, and easily measure aspheric surfaces, which have been difficult to be measured with high precision.

Instead of the Alvarez lens 35, CGH may be used which is manufactured so as to generate components of high orders of a moving radius of a wave front. The zoom lens 8 may be replaced with a plurality of single-focus lenses one of which may be inserted into and separated from the optical axis.

Moreover, each embodiment of the present invention may easily manufacture aspheric optical element, which has existed as a designed value but its actual process has been difficult. In particular, an EUV or any other optical system that requires strict accuracy and restricts the number of available elements may use such an aspheric optical element as has not hitherto been actually available due to its process measurement difficulties. In addition, each embodiment of the present invention is applicable to aspheric surfaces in exposure apparatuses in a range of conventional UV, DUV, and VUV as well as EUV. An optical system that has increased flexibility with an aspheric surface provides a large effect to semiconductor exposure apparatuses. Of course, an application of inventive aspheric surfaces is applicable not only to semiconductor exposure apparatuses, but also to other optical apparatuses.

According to the present invention, there are provided an interferometer and an interference measurement method, which are able to measure an aspheric shape with accuracy similar to that of the spherical-surface measurement, and properly measure various surface shapes.

In addition, the present invention measures a surface shape of an optical element applicable as a projection lens (or projection optical system) that accurately transfers a reticle pattern of a predetermined magnification (or reduction ratio) onto a wafer with good image-forming performance and reduced aberration, and provides a highly precise projection optical system.

What is claimed is:

1. An interferometer for measuring a surface shape of an optical element using interference, said interferometer comprising a reference wave-front generating unit for generating a reference wave front for measuring the surface shape, which is provided in a target optical path, and includes an Alvarez lens.

2. An interferometer according to claim 1, wherein said Alvarez lens generates a sixth-order or higher component of a moving radius of the reference wave front.

3. An interferometer according to claim 1, wherein there are plural Alvarez lens pairs, the number of Alvarez lens pairs corresponding to the number of orders of a moving radius in the wave-front to be changes.

4. An interferometer according to claim 1, wherein said Alvarez lens generates a fourth-order or higher component of a moving radius of the wave-front.

5. An interferometer according to claim 1, wherein said wave-front changing unit variably changes a fourth-order or higher component of a moving radius of the wave-front.

6. An interferometer for measuring a surface shape of an optical element using an interference signal, said interferometer comprising a wave-front changing unit, wherein a light which forms the interference signal passes the unit and said unit variably changing a fourth-order or higher component of a moving radius of the wave-front.

7. An interferometer according to claim 6, wherein said wave-front changing unit includes a plurality of optical members, a position of each optical member being determined at such a position that aberration changed in said wave-font changing unit may be minimized.

8. An interferometer according to claim 6, wherein said wave-front generating unit has a spherical aberration generating part.

9. An interferometer according to claim 8, wherein said spherical aberration generating mechanism has a plurality of lens members, and adjusts generation of aberration by adjusting a separation between two of the lens members.

10. An interferometer according to claim 8, wherein said spherical aberration generating mechanism has a plurality of lens members for serving as a parallel plane, said optical member being able to adjust a parallel plane.

11. An interferometer according to claim 6, wherein said wave-front changing unit includes an Alvarez lens.

12. An interferometer according to claim 6, wherein said reference wave-front generating unit includes:
    a mobile part that may variably change the wave-font; and
        a monitor part for monitoring positional information of said mobile part.

13. An interferometer according to claim 12, wherein said interferometer uses a moving amount of the mobile part obtained from the monitor part to calculate the wave-front to be changed and uses the calculated wave-font for the reference wave-font.

14. An interference measurement method for measuring a surface shape of an optical element using an interference signal, said method comprising the steps of:
    changing a wave-font of a light which forms the interference signal as a measurement reference for the surface shape by using a reference wave-front changing unit including an Alvarez lens pair;

detecting the interference sinal caused by light which passed the optical element; and measuring the surface shape of the optical element on the basis of the detected interference signal.

15. A method according to claim 14, wherein said wave-front changing unit variably changes a fourth-order or higher component of a moving radius of the wave-front.

16. An interference measurement method for measuring a surface shape of an optical element using interference signal, said method comprising the steps of:

changing a wave-front of a light which forms the interferences signal by using a wave-front changing unit for variably changing a fourth-order or higher component of a moving radius of the wave-front;

detecting the interferene signal caused by light which passed the optical element; and measuring the surface shape of the optical element on the basis of the detected interference signal.

17. A method according to claim 16, wherein said wave-front changing unit includes a plurality of optical members, a reference position of each optical members, a reference position of each optical member being determined at such a position that aberration changed in said wave-front changing unit may be minimized.

18. A method according to claim 16, wherein said wave-front changing unit includes a mobile part that may variably change the wave-front, and wherein said changing step calculating a shape of the wave-front based on a moving amount obtained by monitoring positional information of the mobile part.

19. An exposure apparatus using an optical element manufactured by using an interferometer for measuring a surface shape of an optical element using an interference signal, the interferometer comprising a a wave-front changing unit including an Alvarez lens pair, wherein a light which forms the interference signal passes the unit and said unit being able to ch;ange a wave-front of the light into a plural.

20. An exposure apparatus using an optical element manufactured by using an interferometer for measuring a surface shape of an optical element using an interference, the interferometer comprising a wave-front changing unit, wherein a light which forms the interference signal passes the unit and said unit varibly changing a fourth- order or higher component of a moving radius of the wave-front of the light.

21. An exposure apparatus using an optical element manufactured by using an interference measurement method for measuring a surface shape of an optical element using interference, the method comprising the steps of changing a wave-front of a light which forms the interference signal by using a wave-front changing unit including an Alvarez lens pair, detecting the interference signal caused by light which passed the optical element, and measuring the surface shape of the optical element on the basis of the detected interference element.

22. An exposure apparatus using an optical element manufactured by using an interference measurement method for measuring a surface shape of an optical element using interference, the method comprising the steps of changing a wave-front of a light which forms the interference signal by using a wave-front changing unit for variably generating a fourth-order or higher component of a moving radius of the wave-front, detecting the interference signal caused by light which passed the optical element, and measuring the surface shape by interfering of the optical element on the basis of the detected interference signal.

23. An interferometer for measuring surface information of a target surface by interfering a wave-front mirror with a target wave-front from the target surface, and interferometer comprising a wave-front changing unit for changing a wave-front of the light causing interference, wherein said wave-front changing unit comprising:

a spherical aberration generating part for variably generating a spherical aberration; and an Alvarez lens pair for variably changing a component of six or higher power of moving radius of the wave-front.

24. An interference measurement method for measuring a surface shape of an optical element using interference, said method comprising the steps of:

dividing a measurement surface of the optical element into at least two segments;

interference-measuring each segment, wherein in measuring a surface shape, a wave-front for measurement of at least one segment is an shape, a wave-front for a measurement of at least one segment is an aspheric wave-front and an aspheric wave-front changing part approximately independently controllably forming each for fourth-order or higher components of a moving radius of the wave-front in the aspheric wave-front.

25. A method according to claim 24, further comprising a step of:

approximately independently controllably, in the aspheric wave-front each of fourth-order or higher components of a moving radius of the wave-front; and controlling curvature of a spherical component for each segment to be measured.

26. A method according to claim 24, wherein the aspheric wave-front changing part includes at least an Alvarez lens pair.

27. A method according to claim 26, wherein there is a one-to-one correspondence between the Alvarez lens pair in the aspheric wave-front changing part and a component to be independently controlled.

28. A method according to claim 27, wherein the aspheric wave-front changing part controls three components of fourth, sixth and eighth orders of the moving radius in the wave-front in the aspheric wave-front, and each component is approximately independently controlled by a corresponding Alvarez lens pair.

29. A method according to claim 28, wherein an aspheric surface amount controlled by the Alvarez lens pair does not exceed 20 times wavelength of light used for the measurement.

30. An interference measurement metho for measuring a surface shape on an optical element using interference, said method comprising the steps of:

dividing a measurement surface of the optical elment into at least two segments; and interference-measuring each segment, wherein in measuring a surface shape, the measurement surface is divided into a plurality of segments according to a distance from an optical axis, and a wave-front for a measurement of at lest one segment is an aspheric wave-front, and wherein the aspheric wave-front is approximately independently controlled in fourth order or higher components in a moving radius of the wave-front.

31. A method according to cliam 30, wherein spherical components in the aspheric wave-front are different for each divided segment, an offset amount between the aspheric wave-front and a target surface in each segment does not exceed 10 times wavelength of light used for the measurment.

32. A method according to claim 30, wherein each of fourth order or higher components of a moving radius in the wave-front is approximately independently controlled by the Alvarez lens pairs, and an aspheric surface amount of each component does not exceed 20 times wavelength of light used for the measurement.

33. An exposure apparatus using an optical element manufactured by using an interference measurement method for measuring a surface shape of an optical element using interference, said method comprising the steps of:

dividing a measurement surface of the optical element into at least two segments, and interference-measuring each segment, wherein in measuring a surface shaper, a wave-front, for a measurement of at least one segment is an aspheric wave-front, and an aspheric wave-front from changing part approximately independently controllably forming each of fourth-order or higher components of a moving radius of the wave-front in the aspheric wave-front.

* * * * *

UNITED STATES PATENT AND TRADEMARK OFFICE
CERTIFICATE OF CORRECTION

PATENT NO.           : 7,106,455 B2
APPLICATION NO. : 10/091985
DATED                    : September 12, 2006
INVENTOR(S)         : Akiyoshi Suzuki and Yoshiyuki Sekine It is certified that error appears in the above-identified patent and that said Letters Patent is hereby corrected as shown below:

In the Claims:

Please replace Claims 1, 2, 4, 8, 11, 12, 16, 19-25, 30-31 and 33 with the following claims respectively:

1. An interferometer for measuring a surface shape of an optical element using <u>an</u> interference <u>signal</u>, said interferometer comprising ~~a reference wave-front generating unit for generating a reference wave-front for measuring the surface shape, which is provided in a target optical path, and includes an Alvarez lens~~ <u>a wave-front changing unit including an Alvarez lens pair, wherein a light which forms the interference signal passes the unit and said unit being able to change a wave-front of the light into plural shapes</u>.

2. An interferometer according to claim 1, wherein said Alvarez lens <u>pair</u> ~~generates~~ <u>changes</u> a sixth-order or higher component of a moving radius of the ~~reference~~ wave-front.

4. An interferometer according to claim 1, wherein said Alvarez lens ~~generates~~ <u>changes</u> a fourth-order or higher component of a moving radius of the ~~reference~~ wave<u>-</u>front.

8. An interferometer according to claim 6, wherein said wave-front ~~generating~~ <u>changing</u> unit has a spherical aberration generating part.

11. An interferometer according to claim 6, wherein said wave-front changing unit includes an Alvarez lens <u>pair</u>.

UNITED STATES PATENT AND TRADEMARK OFFICE
CERTIFICATE OF CORRECTION

PATENT NO. : 7,106,455 B2
APPLICATION NO. : 10/091985
DATED : September 12, 2006
INVENTOR(S) : Akiyoshi Suzuki and Yoshiyuki Sekine It is certified that error appears in the above-identified patent and that said Letters Patent is hereby corrected as shown below:

Please replace Claims with the following (cont'd)

12. An interferometer according to claim 6, wherein said ~~reference~~ wave-front ~~generating~~ changing unit includes:

a mobile part that may variably change the wave-font; and a monitor part for monitoring positional information of said mobile part.

16. An interference measurement method for measuring a surface shape of an optical element using an interference signal, said method comprising the steps of:

changing a wave-front of a light which forms the interferences signal by using a wave-front changing unit for variably changing a fourth-order or higher component of a moving radius of the wave-front;

detecting the ~~interferenc~~ interference signal caused by light which passed the optical element; and measuring the surface shape of the optical element on the basis of the detected interference signal.

19. An exposure apparatus using an optical element manufactured by using an interferometer for measuring a surface shape of an optical element using an interference signal, the interferometer comprising a a wave-front changing unit including an Alvarez lens pair, wherein a light which forms the interference signal passes the unit and said unit being able to ~~ch;ange~~ change a wave-front of the light into a plural shapes.

UNITED STATES PATENT AND TRADEMARK OFFICE
CERTIFICATE OF CORRECTION

| | | |
|---|---|---|
| PATENT NO. | : 7,106,455 B2 | |
| APPLICATION NO. | : 10/091985 | |
| DATED | : September 12, 2006 | |
| INVENTOR(S) | : Akiyoshi Suzuki and Yoshiyuki Sekine | |

It is certified that error appears in the above-identified patent and that said Letters Patent is hereby corrected as shown below:

Please replace Claims with the following (cont'd)

20. An exposure apparatus using an optical element manufactured by using an interferometer for measuring a surface shape of an optical element using an interference signal, the interferometer comprising a wave-front changing unit, wherein a light which forms the interference signal passes the unit and said unit ~~varibly~~ variably changing a fourth- order or higher component of a moving radius of the wave-front of the light.

21. An exposure apparatus using an optical element manufactured by using an interference measurement method for measuring a surface shape of an optical element using an interference signal, the method comprising the steps of changing a wave-front of a light which forms the interference signal by using a wave-front changing unit including an Alvarez lens pair, detecting the interference signal caused by light which passed the optical element, and measuring the surface shape of the optical element on the basis of the detected interference ~~element~~ signal.

22. An exposure apparatus using an optical element manufactured by using an interference measurement method for measuring a surface shape of an optical element using an interference signal, the method comprising the steps of changing a wave-front of a light which forms the interference signal by using a wave-front changing unit for variably generating a fourth-order or higher component of a moving radius of the wave-front, detecting the interference signal caused by light which passed the optical element, and measuring the surface shape by interfering of the optical element on the basis of the detected interference signal.

UNITED STATES PATENT AND TRADEMARK OFFICE
CERTIFICATE OF CORRECTION

| | | |
|---|---|---|
| PATENT NO. | : 7,106,455 B2 | |
| APPLICATION NO. | : 10/091985 | |
| DATED | : September 12, 2006 | |
| INVENTOR(S) | : Akiyoshi Suzuki and Yoshiyuki Sekine | |

It is certified that error appears in the above-identified patent and that said Letters Patent is hereby corrected as shown below:

Please replace Claims with the following (cont'd)

23. An interferometer for measuring surface information of a target surface by interfering a wave-front <u>a reference</u> mirror with a target wave-front from the target surface, [and] <u>said</u> interferometer comprising a wave-front changing unit for changing a wave-front of the light causing interference, wherein said wave-front changing unit comprising: a spherical aberration generating part for variably generating a spherical aberration; and an Alvarez lens pair for variably changing a component of six or higher power of moving radius of the wave-front.

24. An interference measurement method for measuring a surface shape of an optical element using interference, said method comprising the steps of:

dividing a measurement surface of the optical element into at least two segments;

interference-measuring each segment, wherein in measuring a surface shape, a wave-front for measurement of at least one segment is an ~~shape, a wave-front for a measurement of at least one segment is an~~ aspheric wave-front and an aspheric wave-front changing part approximately independently controllably forming each for fourth-order or higher components of a moving radius of the wave- front in the aspheric wave-front.

25. A method according to claim 24, further comprising a step of:

approximately independently ~~controllably~~ <u>controlling</u>, in the aspheric wave-front each of fourth-order or higher components of a moving radius of the wave-front; and controlling curvature of a spherical component for each segment to be measured.

UNITED STATES PATENT AND TRADEMARK OFFICE
CERTIFICATE OF CORRECTION

| | | |
|---|---|---|
| PATENT NO. | : 7,106,455 B2 | |
| APPLICATION NO. | : 10/091985 | |
| DATED | : September 12, 2006 | |
| INVENTOR(S) | : Akiyoshi Suzuki and Yoshiyuki Sekine | |

It is certified that error appears in the above-identified patent and that said Letters Patent is hereby corrected as shown below:

Please replace Claims with the following (cont'd)

30. An interference measurement ~~metho~~ method for measuring a surface shape on an optical element using interference, said method comprising the steps of:

dividing a measurement surface of the optical ~~elment~~ element into at least two segments; and interference-measuring each segment, wherein in measuring a surface shape, the measurement surface is divided into a plurality of segments according to a distance from an optical axis, and a wave-front for a measurement of at lest one segment is an aspheric wave-front, and wherein the aspheric wave-front is approximately independently controlled in fourth order or higher components in a moving radius of the wave-front.

31. A method according to ~~cliam~~ claim 30, wherein spherical components in the aspheric wave-front are different for each divided segment, an offset amount between the aspheric wave-front and a target surface in each segment does not exceed 10 times wavelength of light used for the ~~measurment~~ measurement.

UNITED STATES PATENT AND TRADEMARK OFFICE
CERTIFICATE OF CORRECTION

| | | |
|---|---|---|
| PATENT NO. | : 7,106,455 B2 | |
| APPLICATION NO. | : 10/091985 | |
| DATED | : September 12, 2006 | |
| INVENTOR(S) | : Akiyoshi Suzuki and Yoshiyuki Sekine | |

It is certified that error appears in the above-identified patent and that said Letters Patent is hereby corrected as shown below:

Please replace Claims with the following (cont'd)

33. An exposure apparatus using an optical element manufactured by using an interference measurement method for measuring a surface shape of an optical element using interference, said method comprising the steps of:

dividing a measurement surface of the optical element into at least two segments, and interference-measuring each segment, wherein in measuring a surface ~~shaper~~ shape, a wave-front, for a measurement of at least one segment is an aspheric wave-front, and an aspheric wave-front ~~from~~ changing part approximately independently controllably forming each of fourth-order or higher components of a moving radius of the wave-front in the aspheric wave-front.

Signed and Sealed this

Tenth Day of July, 2007

JON W. DUDAS
*Director of the United States Patent and Trademark Office*